United States Patent Office 2,908,698
Patented Oct. 13, 1959

2,908,698

PROCESS OF PREPARING HEXAALKYLDISILANE

Mamoru Kuriyagawa, Tokyo, and Makoto Kumada, Obama-shi, Fukui-ken, Japan, assignors to Tokyo Shibaura Electric Co., Ltd., Kanagawa-ken, Japan No Drawing. Application September 8, 1953
Serial No. 379,059

Claims priority, application Japan September 12, 1952

4 Claims. (Cl. 260—448.2)

This invention relates to a process of preparing methylethyl disilanes and more particularly to a process of obtaining methylethyl disilanes from the substance of a higher boiling point obtained in preparing alkylhalogenosilanes by the direct method. The direct method mentioned in this specification and claims means the method set forth in U.S. Patents Nos. 2,380,995, 2,380,996 and 2,380,997. The inventors of the present invention suggested a process of obtaining hexaalkyldisiloxane from the comparatively low boiling fraction in the substance of a higher boiling point obtained in preparing an alkylhalogenosilane by the direct method in Japanese patent application No. 5,400/1952. The present invention is further intended to obtain easily by physical and chemical operations methylethyl disilanes from said substance having a boiling point of 125 to 160° C. in said hitherto abandoned substance. It is difficult to prepare such methylethyl disilanes. Only instances wherein a very small amount of hexamethyldisilane was obtained from a special organosilicon compound are known. For example, in each of Mr. Bygdén's method [Berichte der Deutschen Chemischen Gesellschaft, vol. 45, page 707 (1912), and Zeitschrift fuer Physikaeische Chemie, vol. 90, page 246 (1915)] and Mr. Martin's method [Berichte der Deutschen Chemischen Gesellschaft, vol. 46, page 3294 (1913)], hexamethyldisilane was obtained by the reaction of hexachlorodisilane $Si_2Cl_6$ with methyl magnesium bromide $CH_3MgBr$ and the yield was as low as about 10%. The constants of hexamethyldisilane thus obtained were as shown in the following table:

|  | Boiling Point (° C.) | Melting Point (° C.) | $N^{24.2}$ | $d_4^{24.4}$ |
|---|---|---|---|---|
| Bygdén | 113–114/756 mm. Hg | 12.5–14.0 | 1.4207 | 0.7230 |
| Martin | 112–112.5/759.5 mm. Hg | 11.5–12.5 | | |

According to the thesis of Messrs. Blockway and Davidson, the Journal of the American Chemical Society, vol. 63, page 3287 (1941), only less than 1 cc. of hexamethyldisilane could be synthesized by reacting zinc dimethyl $(CH_3)_2Zn$ with hexachlorodisilane in the course of studying molecular structure thereof.

An object of this invention is to obtain economically useful organosilicon compounds from the aforementioned substance.

Another object of this invention is to obtain methylethyl disilanes from the by-products in directly producing methyl halogenosilanes by passing a methyl halide over a contact mass.

A further object is to obtain good yields of methylethyl disilanes from the above by-products.

A further object is to obtain easily in a comparatively large amount methylethyl disilanes which are very useful compounds as raw materials for producing other organosilicon compounds.

In this invention, no special raw material is used but the substances of a higher boiling point, that is, 110–160° C., in producing methyl halogenosilanes by the direct method is used as a raw material. We have found that said substance contains halogenodisilanes and/or methylchlorodisilanes having the following formula:

(1)

wherein $R_1$, $R_2$, $R_3$, $R_4$, $R_5$ and $R_6$ are chlorine or methyl, and at least one of them is chlorine.

In U.S. Patents Nos. 2,380,995, 2,380,996 and 2,380,997 the so-called direct method, wherein a reaction product obtained by introducing methyl chloride onto a copper-silicon contact mass at 300° C. is fractionated, is disclosed and it is pointed out that, in the examples of fractional distillation, about 60 to 80% distilled off at temperatures below 71° C. and that the remainder could not be easily distilled. The inventors of the present invention re-distilled an example of such residue and examined the substance of a higher boiling point. As a result, we have ascertained that the higher boiling substance comprises disilanes of the formula:

$$(CH_3)_nCl_{6-n}Si_2$$

wherein $n$ represents 1, 2, 3, 4 or 5. The chlorine content in said compound is measured. In distilling the substance having a high boiling point, it is fractionally distilled step by step in respect of boiling points. These fractions are alkylated separately. All the fractions may be alkylated at the same time and thereafter the alkylated product may be fractionated.

The following example illustrates the actual embodiments of our invention; it is to be understood that this is only illustrative and is not to be taken as in any way limiting our invention.

*Example 1*

A fraction with a boiling point of 150 to 160° C. was taken by distilling a reaction mixture obtained by passing methyl chloride over a copper-silicon contact mass heated at about 300° C. This fraction consisted mainly of methyldisilane chloride containing 48.45% chlorine. 84 g. of this fraction were dissolved in the equal weight of ether. This methyldisilane chloride solution was added with stirring in the course of about an hour to ethyl magnesium bromide prepared by known processes from 38 g. of magnesium (30% in excess of the calculated amount), 171 g. of ethyl bromide (1.57 moles) and 600 cc. of anhydrous ether. After the stirring had been continued for 30 minutes more, the ether was distilled off. Then, when the mixture was heated on a boiling water bath, a solid caky substance was obtained. When this solid substance was crushed and thrown little by little into a mixture of ice and hydrochloric acid, it was hydrolyzed and an organic layer floated. This organic layer was de-acidified by washing with water and alkali. When said layer was further dried over calcium chloride and was then distilled, 57 g. of a fraction having a boiling point up to 220° C. were distilled out and 4 g. of residue remained. A soluble substance obtained by adding sulfuric acid to this distillate mainly contained alkyldisiloxane (13 g. thereof being obtained by distillation). By separating and fractionating the insoluble substance, methyl-ethyl-disilanes were obtained, principal of them being as follows:

| Type | Boiling Point (° C.) | Yield (cc.) | $N_D^{20}$ | $d_4^{20}$ |
|---|---|---|---|---|
| A | 168–171 | 10.8 | 1.4440 | 0.7720 |
| B | 192–194 | 20.1 | 1.4540 | 0.7890 |
| C | 207–212 | 10.1 | 1.4603 | 0.8051 |

From the values of the following analytical results, A, B and C were decided to be tetramethyl-diethyl-disilane, trimethyl-triethyl-disilane and dimethyl-tetraethyl-disilane, respectively.

| Values | A | B | C |
|---|---|---|---|
|  | ($C_8H_{22}Si_2$) | ($C_9H_{24}Si_2$) | ($C_{10}H_{26}Si_2$) |
| $MR_D$[1] Calculated percent | 60.33 | 64.62 | 69.59 |
| Found percent | 60.1 | 64.96 | 68.8 |
| Si Calculared percent |  | 29.2 |  |
| Found |  | 28.9 |  |

[1] $MR_D$: Molar refractive index.

By checking the decomposition products obtained by halogenating these methylethyldisilanes by the halogenating method shown in Japanese patent application No. 14,442/1952, filed on September 12, 1952, on another invention, the positions of the alkyl radicals could be confirmed. For example, from the fact that, when bromine was acted on trimethyltriethyldisilane B, dimethylbromosilane and methyldimethylethylbromosilane in approximately equal weight were obtained, B was identified to be 1.1.2-trimethyl-1.2.2-triethyl-disilane as shown by the following formula:

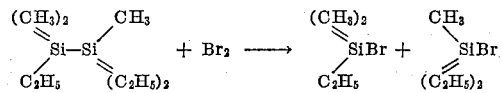

We claim:

1. A process of obtaining methylethyldisilanes by distilling out a fraction having a boiling point up to 230° C. from a product obtained by the Grignard reaction by adding 2–4 mols of ethyl magnesium halide to a substance fractionated at 125° to 160° C. by distilling a reaction mixture obtained by passing methyl chloride over a copper-silicon contact mass heated to about 300° C.

2. A process of obtaining tetramethyldiethyldisilane as a fraction boiling between 168° and 171° C. by distilling the product obtained by the Grignard reaction according to claim 1.

3. A process of obtaining trimethyltriethyldisilane as a fraction boiling between 192° and 194° C. by distilling the product obtained by the Grignard reaction according to claim 1.

4. A process of obtaining dimethyltetraethyldisilane as a fraction boiling between 207° and 212° C. by distilling the product obtained by the Grignard reaction according to claim 1.

References Cited in the file of this patent

UNITED STATES PATENTS

| 2,371,068 | Rochow | Mar. 6, 1945 |
| 2,437,204 | McGregor | Mar. 2, 1948 |
| 2,598,435 | Mohler | May 27, 1952 |

OTHER REFERENCES

Bygden: "Berichte," volume 45 (1912), pages 707 to 713.

Martin: "Berichte," volume 46 (1913), pages 3289 to 3295.

Schumb et al.: "Journal American Chemical Society," volume 61 (1939), pages 363 to 366.